United States Patent
Kawasaki

(10) Patent No.: US 11,269,138 B2
(45) Date of Patent: Mar. 8, 2022

(54) SINGLE MODE OPTICAL FIBER AND MANUFACTURING METHOD THEREOF

(71) Applicant: SUMITOMO ELECTRIC INDUSTRIES, LTD., Osaka (JP)

(72) Inventor: Kiichiro Kawasaki, Utsunomiya (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 44 days.

(21) Appl. No.: 16/934,732

(22) Filed: Jul. 21, 2020

(65) Prior Publication Data
US 2021/0026064 A1    Jan. 28, 2021

(30) Foreign Application Priority Data
Jul. 22, 2019   (JP) .............................. JP2019-134350

(51) Int. Cl.
*G02B 6/028* (2006.01)
*C03B 37/025* (2006.01)
*C03B 37/027* (2006.01)
*G02B 6/02* (2006.01)

(52) U.S. Cl.
CPC .......... *G02B 6/0286* (2013.01); *C03B 37/027* (2013.01); *C03B 37/0253* (2013.01); *G02B 6/02214* (2013.01); *C03B 2203/24* (2013.01)

(58) Field of Classification Search
CPC .................................................. G02B 6/0286
See application file for complete search history.

(56) References Cited

U.S. PATENT DOCUMENTS

| 5,676,725 | A | 10/1997 | Ito et al. |
| 8,977,094 | B2* | 3/2015 | Oyamada ............. G02B 6/0283 385/126 |
| 2002/0021877 | A1 | 2/2002 | Kyogoku et al. |
| 2015/0331180 | A1* | 11/2015 | Oyamada .......... C03B 37/01413 385/124 |
| 2021/0026064 | A1* | 1/2021 | Kawasaki ............. C03B 37/027 |

FOREIGN PATENT DOCUMENTS

| JP | H07-061830 A | 3/1995 |
| JP | H09-263418 A | 10/1997 |
| WO | WO-00-026709 A1 | 11/2000 |

* cited by examiner

*Primary Examiner* — Rhonda S Peace
(74) *Attorney, Agent, or Firm* — Faegre Drinker Biddle & Reath LLP

(57) ABSTRACT

T/C, which is a ratio of an area T of a skirt part outside the boundary to an area C of the core region in a refractive index distribution, is 4% or more and 30% or less, the boundary is defined at a position where an absolute value of a change amount of the index becomes maximum between the center of the core region and the outer peripheral part of the first clad region, the area C of the core region is defined in a range from the center of the core region to the boundary in the radial direction, the area T of the skirt part is defined in a range from the boundary to the outer peripheral part of the first clad region.

5 Claims, 2 Drawing Sheets

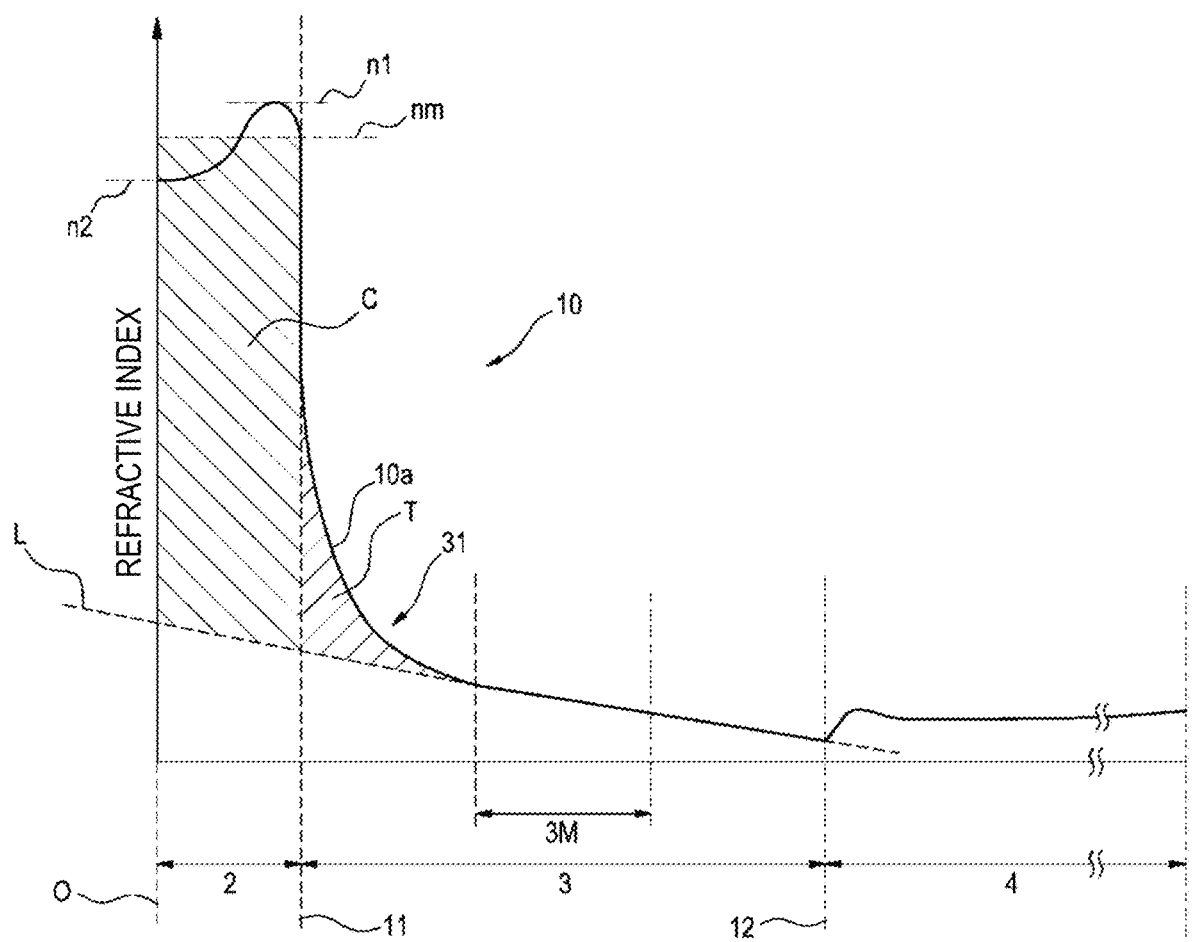

SINGLE MODE OPTICAL FIBER AND MANUFACTURING METHOD THEREOF

CROSS-REFERENCE TO RELATED APPLICATIONS

This application claims priority from Japanese Patent Application No. 2019-134350, filed on Jul. 22, 2019, the entire subject matter of which is incorporated herein by reference.

TECHNICAL FIELD

The present disclosure relates to a single mode optical fiber and a manufacturing method of the single mode optical fiber.

BACKGROUND ART

JP-A-7-61830 and JP-A-9-263418 describe a manufacturing method of a single mode optical fiber base material and a manufacturing apparatus thereof. International Publication No. WO 2000/26709 describes a single mode optical fiber and a manufacturing method thereof.

A boundary portion between a core region and a clad region of the single mode optical fiber includes a refractive index distribution in which a refractive index continuously changes from the core region toward the clad region. In the boundary portion, there exists a portion where the refractive index distribution becomes a skirt-spread shape, and this region is referred to as a skirt part (or skirt sagging).

When an area of the skirt part is large, the optical power that transmits the optical fiber is affected by the skirt part and thus a zero dispersion wavelength becomes larger than a transmission wavelength, thereby causing a problem that dispersion characteristics deteriorate.

On the other hand, when the area of the skirt part is too small, distortion inside the optical fiber remains after drawing due to a viscosity difference between the materials in the core region and the clad region, thereby not only causing an increase in transmission loss but also causing deterioration in hydrogen resistance characteristics due to the increase in glass defects.

When the area of the skirt part is defined as T and an area of the core region is defined as C, it is considered that the above-described problem can be solved by setting a value of T/C, which is a ratio of the area T of the skirt part to the area C of the core region, within an appropriate range. For example, the area T of the skirt part can be determined by the method described in JP-A-7-61830 and JP-A-9-263418. Specifically, in the method described in JP-A-7-61830 and JP-A-9-263418, among the clad portions in the refractive index distribution, a refractive index of a horizontal portion is defined as a refractive index of the clad, and an area within a range surrounded by a horizontal line of the value, an interface between the core and the clad, and a refractive index curve is defined as the area T of the skirt part. Meanwhile, according to the method described in JP-A-7-61830 and JP-A-9-263418, even though the area T of the skirt part is determined and the value of the T/C is set within the appropriate range, the dispersion characteristics may deteriorate. This deterioration is caused by the following problems in a method of determining the area T of the skirt part.

In the method of determining the area T of the skirt part disclosed in JP-A-7-61830 and JP-A-9-263418, when the horizontal portion in the clad portion in the refractive index distribution does not exist, it is difficult to determine the refractive index of the clad. When the horizontal portion in the clad portion in the refractive index distribution is close to an outer peripheral part of the clad, the area T of the skirt part obtained by the above-described determination method is calculated to be large in a numerical value. Meanwhile, even when the numerical value of the area T of the skirt part obtained by the above-described determination method is large, the dispersion characteristics may not necessarily deteriorate.

SUMMARY OF INVENTION

An object of the present disclosure is to provide a single mode optical fiber having good dispersion characteristics, and good transmission loss and hydrogen resistance characteristics, and a manufacturing method of the single mode optical fiber.

An aspect of the present disclosure is a single mode optical fiber having a refractive index distribution in which a refractive index continuously changes at a boundary between a core region and a first clad region, the singe mode optical fiber comprising:

the core region whose maximum refractive index is n1;

the first clad region provided on an outer peripheral side of the core region and having a refractive index smaller than the refractive index n1; and a second clad region provided on an outer peripheral side of the first clad region and having a refractive index greater than a refractive index of an outer peripheral part of the first clad region, wherein T/C, which is a ratio of an area T of a skirt part outside the boundary to an area C of the core region in the refractive index distribution, is 4% or more and 30% or less, the boundary, in the refractive index distribution, is defined at a position where an absolute value of a change amount in a radial direction of the refractive index becomes maximum between the center of the core region and the outer peripheral part of the first clad region, the area C of the core region, in the refractive index distribution, is defined by an area between a refractive index straight line of the first clad region and a straight line of an average refractive index of the core region in a range from the center of the core region to the boundary in the radial direction, the area T of the skirt part, in the refractive index distribution, is defined by an area between the refractive index straight line of the first clad region and a curve of the refractive index distribution in a range where the refractive index is greater than the refractive index straight line of the first clad region in a range from the boundary to the outer peripheral part of the first clad region in the radial direction, and the refractive index straight line of the first clad region, in the refractive index distribution, is defined by a value or a straight line approximation line obtained by averaging only a part or all of the refractive indexes in a range of a central part obtained by dividing the range from the boundary to the outer peripheral part of the first clad region into three parts in the radial direction.

An aspect of the present disclosure is a manufacturing method of a single mode optical fiber that has a refractive index distribution in which a refractive index continuously changes at a boundary between a core region and a first clad region, and that includes the core region whose maximum refractive index is n1; the first clad region provided on an outer peripheral side of the core region and having a refractive index smaller than the refractive index n1; and a second clad region provided on an outer peripheral side of the first clad region and having a refractive index greater than a refractive index of an outer peripheral part of the first clad region, comprising:

a process of generating a core base material including the core region and the first clad region;

a process of performing quality determination by measuring the refractive index distribution of the core base material;

a process of generating an optical fiber base material by forming the second clad region on the outer peripheral side of the core base material that is determined as a good product by the quality determination; and a process of manufacturing the single mode optical fiber by drawing the optical fiber base material, wherein the process of performing the quality determination includes a step of performing the determination by T/C which is a ratio of an area C of the core region and an area T of a skirt part outside the boundary in the refractive index distribution, the boundary, in the refractive index distribution, is defined at a position where an absolute value of a change amount in a radial direction of the refractive index becomes maximum between the center of the core region and the outer peripheral part of the first clad region, the area C of the core region, in the refractive index distribution, is defined by an area between a refractive index straight line of the first clad region and a straight line of an average refractive index of the core region in a range from the center of the core region to the boundary in the radial direction, the area T of the skirt part, in the refractive index distribution, is defined by an area between the refractive index straight line of the first clad region and a curve of the refractive index distribution in a range where the refractive index is greater than the refractive index straight line of the first clad region in a range from the boundary to the outer peripheral part of the first clad region in the radial direction, and the refractive index straight line of the first clad region, in the refractive index distribution, is defined by a value or a straight line approximation line obtained by averaging only a part or all of the refractive indexes in a range of a central part obtained by dividing the range from the boundary to the outer peripheral part of the first clad region into three parts in the radial direction.

According to the present disclosure, it is possible to provide a single mode optical fiber having good dispersion characteristics, and good transmission loss and hydrogen resistance characteristics, and a manufacturing method of the single mode optical fiber.

BRIEF DESCRIPTION OF DRAWINGS

FIG. 2 is a diagram illustrating the definition of an area T of a skirt part and an area C of a core region in the refractive index distribution of FIG. 1.

DESCRIPTION OF EMBODIMENTS

Figure 1:
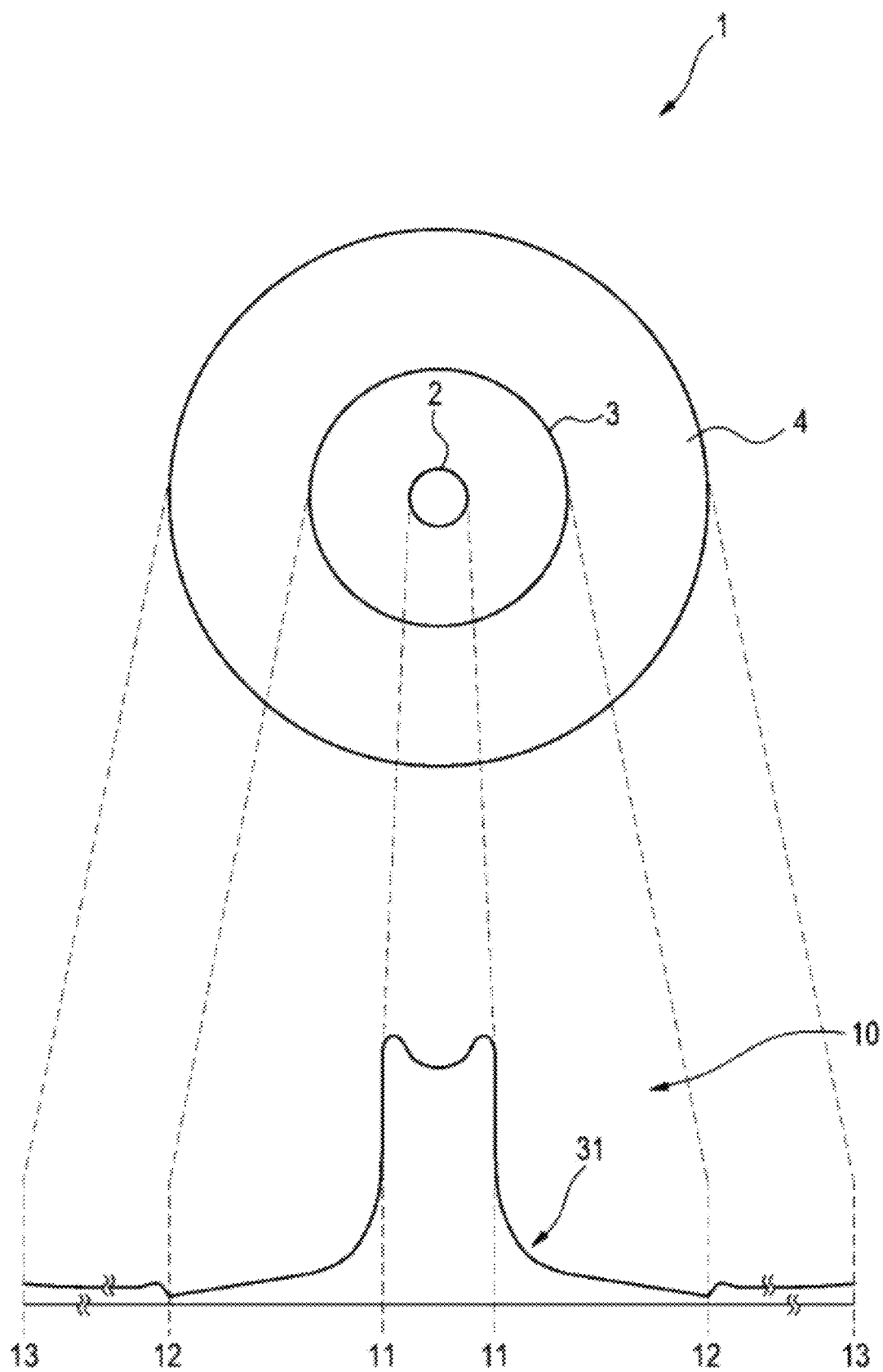
FIG. 1 is a schematic diagram illustrating a cross-sectional structure and a refractive index distribution of a single mode optical fiber according to an embodiment.

Description of Embodiments of the Present Disclosure

First, embodiments of the present disclosure will be listed and described.

A single mode optical fiber according to an aspect of the present disclosure has at least one of the following configuration as shown in (1) to (3) below.

(1) A single mode optical fiber having a refractive index distribution in which a refractive index continuously changes at a boundary between a core region and a first clad region, the singe mode optical fiber comprising:

the core region whose maximum refractive index is n1;

the first clad region provided on an outer peripheral side of the core region and having a refractive index smaller than the refractive index n1; and a second clad region provided on an outer peripheral side of the first clad region and having a refractive index greater than a refractive index of an outer peripheral part of the first clad region, wherein T/C, which is a ratio of an area T of a skirt part outside the boundary to an area C of the core region in the refractive index distribution, is 4% or more and 30% or less, the boundary, in the refractive index distribution, is defined at a position where an absolute value of a change amount in a radial direction of the refractive index becomes maximum between the center of the core region and the outer peripheral part of the first clad region, the area C of the core region, in the refractive index distribution, is defined by an area between a refractive index straight line of the first clad region and a straight line of an average refractive index of the core region in a range from the center of the core region to the boundary in the radial direction, the area T of the skirt part, in the refractive index distribution, is defined by an area between the refractive index straight line of the first clad region and a curve of the refractive index distribution in a range where the refractive index is greater than the refractive index straight line of the first clad region in a range from the boundary to the outer peripheral part of the first clad region in the radial direction, and the refractive index straight line of the first clad region, in the refractive index distribution, is defined by a value or a straight line approximation line obtained by averaging only a part or all of the refractive indexes in a range of a central part obtained by dividing the range from the boundary to the outer peripheral part of the first clad region into three parts in the radial direction.

According to the single mode optical fiber having the above-described configuration, in the single mode optical fiber in which the clad is formed of the first clad region and the second clad region, the area C of the core region and the area T of the skirt part are defined as described above, whereby a relationship between a skirting amount and dispersion characteristics is hard to shift, and thus it becomes easy to set the dispersion characteristics to an appropriate value. That is, according to the definition of the area C of the core region and the area T of the skirt part, even though a horizontal portion in the first clad region in the refractive index distribution does not exist, it is easy to determine the refractive index of the clad, and when the horizontal portion in the first clad region in the refractive index distribution is close to the outer peripheral part of the first clad region, a numerical value is not calculated to be large.

Next, since the range of the T/C is 4% or more, the area of the skirt part is not too small, and distortion inside the single mode optical fiber due to a viscosity difference between the materials of the core and the clad is suppressed, thereby making it possible to prevent an increase in transmission loss and deterioration in hydrogen resistance characteristics.

Since the range of the T/C is 30% or less, the area of the skirt part is not too large, the influence of the skirt part on optical power for transmitting the optical fiber is small, and a zero dispersion wavelength becomes a value close to a transmission wavelength, thereby making it possible to improve the dispersion characteristics.

(2) The T/C may be 6% or more and 20% or less.

The range of the T/C is set within 6% or more and 20% or less, thereby making it possible not only to further surely prevent the increase in the transmission loss and the deterioration in the hydrogen resistance characteristics, but also to further improve the dispersion characteristics.

(3) A refractive index n2 at the center of the core region may be smaller than refractive index n1.

In comparison with a refractive index distribution in which the center of the core region becomes the maximum refractive index of the core part, as the refractive index of the center of the core region is lower, the dispersion characteristics become better, such that the dispersion characteristics can be further improved.

A manufacturing method of a single mode optical fiber according to an aspect of the present disclosure has the following configuration as shown in (4) below.

(4) A manufacturing method of a single mode optical fiber that has a refractive index distribution in which a refractive index continuously changes at a boundary between a core region and a first clad region, and that includes the core region whose maximum refractive index is n1; the first clad region provided on an outer peripheral side of the core region and having a refractive index smaller than the refractive index n1; and a second clad region provided on an outer peripheral side of the first clad region and having a refractive index greater than a refractive index of an outer peripheral part of the first clad region, comprising:

a process of generating a core base material including the core region and the first clad region;

a process of performing quality determination by measuring the refractive index distribution of the core base material;

a process of generating an optical fiber base material by forming the second clad region on the outer peripheral side of the core base material that is determined as a good product by the quality determination; and a process of manufacturing the single mode optical fiber by drawing the optical fiber base material, wherein the process of performing the quality determination includes a step of performing the determination by T/C which is a ratio of an area C of the core region and an area T of a skirt part outside the boundary in the refractive index distribution, the boundary, in the refractive index distribution, is defined at a position where an absolute value of a change amount in a radial direction of the refractive index becomes maximum between the center of the core region and the outer peripheral part of the first clad region, the area C of the core region, in the refractive index distribution, is defined by an area between a refractive index straight line of the first clad region and a straight line of an average refractive index of the core region in a range from the center of the core region to the boundary in the radial direction, the area T of the skirt part, in the refractive index distribution, is defined by an area between the refractive index straight line of the first clad region and a curve of the refractive index distribution in a range where the refractive index is greater than the refractive index straight line of the first clad region in a range from the boundary to the outer peripheral part of the first clad region in the radial direction, and the refractive index straight line of the first clad region, in the refractive index distribution, is defined by a value or a straight line approximation line obtained by averaging only a part or all of the refractive indexes in a range of a central part obtained by dividing the range from the boundary to the outer peripheral part of the first clad region into three parts in the radial direction.

According to the manufacturing method of the single mode optical fiber, in the refractive index distribution of the core base material, the quality determination is performed by the T/C which is the ratio of the area T of the skirt part to the area C of the core region. In this quality determination, since the area C of the core region and the area T of the skirt part are defined as described above, the relationship between the skirting amount and the dispersion characteristics is hard to shift, thereby making it possible not only to manage manufacturing with the appropriate skirting amount, but also to accurately determine the quality of the core base material by the value of the T/C.

Next, the core base material that is determined as a good product by the quality determination is used, thereby making it possible to manufacture the single mode optical fiber having good dispersion characteristics, transmission loss, and hydrogen resistance characteristics.

Details of Embodiments of the Present Disclosure

Specific examples of a single mode optical fiber according to embodiments of the present disclosure and a manufacturing method of the single mode optical fiber will be described hereinafter with reference to the drawings.

The present invention is not limited to these examples, but is indicated by the scope of the claims, and is intended to include all the modifications within meanings equivalent to the scope of the claims, and the scope.

FIG. 1 is a schematic diagram illustrating a cross-sectional structure of a single mode optical fiber 1 according to the embodiment and a refractive index distribution 10 thereof. FIG. 2 is a diagram illustrating the right half of the refractive index distribution 10 of FIG. 1, and is a diagram illustrating the definition of an area T of a skirt part 31 and an area C of a core region.

As illustrated in FIG. 1, the single mode optical fiber 1 includes a core region 2, a first clad region 3, and a second clad region 4. The refractive index distribution 10 in the single mode optical fiber 1 has a refractive index distribution in which the refractive index continuously changes at a boundary 11 between the core region 2 and the first clad region 3.

As illustrated in FIG. 2, the core region 2 has a maximum refractive index of n1. A refractive index n2 of the center O of the core region 2 has a refractive index smaller than n1. A refractive index of the first clad region 3 is smaller than n1, and the boundary 11 between the core region 2 and the first clad region 3 is defined as a position at which an absolute value of a change amount in a radial direction of the refractive index becomes the maximum between the center O of the core region 2 and an outer peripheral part 12 of the first clad region 3.

Meanwhile, for example, in the related art technology described in JP-A-7-61830 and JP-A-9-263418, among the clad portions in the refractive index distribution, a refractive index of a horizontal portion is defined as a refractive index of the clad, and an area within a range surrounded by a horizontal line of the value, an interface between the core and the clad, and a refractive index curve is defined as the area of the skirt part.

However, as shown in the refractive index distribution 10 of the single mode optical fiber 1 according to the embodiment, when the horizontal portion in the clad portion in the refractive index distribution does not exist, it is difficult to determine the refractive index of the clad in the related art technology. When the horizontal portion in the clad portion in the refractive index distribution is close to the outer peripheral part of the clad, in the related art technology, even when the area of the skirt part becomes excessively large and the ratio of the area of the skirt part to the area of the core part is large, the dispersion characteristics do not deteriorate.

Accordingly, when using the area of the skirt part determined by the related art technology, the characteristics of the single mode optical fiber cannot be appropriately evaluated.

According to the present invention, the present inventor finds a method of determining the area of the skirt part that can solve the above-mentioned problems in the related art technology.

Therefore, in the single mode optical fiber 1 according to the embodiment, the area T of the skirt part 31, in the refractive index distribution 10, is defined by an area between a refractive index straight line L and a curve 10a of the refractive index distribution 10 in a range where the refractive index is greater than the refractive index straight line L of the first clad region 3, in a range of a radial direction from the boundary 11 to the outer peripheral part 12 of the first clad region 3.

Here, the refractive index straight line L can be determined even though the horizontal portion in the portion of the first clad region 3 in the refractive index distribution 10 does not exist, and is defined as follows so that the area of the skirt part does not become excessively large.

That is, the refractive index starting line L, in the refractive index distribution 10, is defined by a straight line approximation line with respect to a part or all of the refractive indexes in a range of a central part 3M obtained by dividing the range from the boundary 11 to the outer peripheral part 12 of the first clad region 3 into three parts in the radial direction. Only a part or all of the refractive indexes in the range of the central part 3M may be averaged, and a horizontal line passing through the average value may be used instead of the refractive index straight line L.

A portion of the core region 2 in the refractive index distribution 10 may not be constant because a peak is generated at a portion near the boundary 11 with the first clad region 3, and thus an average refractive index nm of the core region 2 is set as an upper limit of the core region 2.

Accordingly, the area C of the core region, in the refractive index distribution 10, is defined by an area between the refractive index straight line L of the first clad region 3 and a straight line of the average refractive index nm of the core region 2 in the range from the center O of the core region 2 to the boundary 11 in the radial direction.

In the embodiment, as described above, the area C of the core region 2 and the area T of the skirt part 31 is defined, after which T/C which is an area ratio therebetween is used to perform quality determination of the single mode optical fiber 1. The T/C of the single mode optical fiber 1 according to the embodiment is set to 4% or more and 30% or less. The T/C of a more desirable single mode optical fiber 1 is set to 6% or more and 20% or less.

According to the single mode optical fiber 1 of the embodiment, in the single mode optical fiber 1 formed by dividing the clad into the first clad region 3 and the second clad region 4, the area C of the core region 2 and the area T of the skirt part 31 are defined as described above, whereby a relationship between a skirting amount and the dispersion characteristics is hard to shift, and thus it becomes easy to set the dispersion characteristics to an appropriate value. That is, according to the definition of the area C of the core region 2 and the area T of the skirt part 31, even when the horizontal portion in the first clad region 3 in the refractive index distribution 10 does not exist, it is easy to determine the refractive index of the clad, and when the horizontal portion in the first clad region 3 in the refractive index distribution 10 is close to the outer peripheral part 12 of the first clad region 3, a numerical value is not calculated to be large.

Since the range of the T/C is 4% or more, the area T of the skirt part 31 is not too small, and distortion inside the single mode optical fiber 1 due to a viscosity difference between the materials of the core and the clad is suppressed, thereby making it possible to prevent an increase in transmission loss and deterioration in hydrogen resistance characteristics.

Since the range of the T/C is 30% or less, the area T of the skirt part 31 is not too large, the influence of the skirt part 31 on optical power for transmitting the optical fiber is small, and a zero dispersion wavelength becomes a value close to a transmission wavelength, thereby making it possible to improve the dispersion characteristics.

The range of the T/C is set within 6% or more and 20% or less, thereby making it possible not only to further surely prevent the increase in the transmission loss and the deterioration in the hydrogen resistance characteristics, but also to further improve the dispersion characteristics.

In the single mode optical fiber 1, the refractive index n2 of the center O of the core region 2 is smaller than the maximum refractive index n1. In comparison with a refractive index distribution in which the center O of the core region 2 becomes the maximum refractive index of the core part, as the refractive index of the center O of the core region 2 is lower, the dispersion characteristics become better, such that the dispersion characteristics can be further improved.

Next, a manufacturing method of the single mode optical fiber 1 according to the embodiment will be described.

[Process of Generating a Core Base Material]

First, a porous base material including the core region 2 and the first clad region 3 provided on the outer peripheral side of the core region 2 is formed by a VAD method or an OVD method, and the porous base material is sintered to generate a transparent core base material.

[Process of Performing Quality Determination]

Next, the refractive index distribution is measured with respect to the generated core base material by using, for example, a preform analyzer. The preform analyzer is a device that measures the refractive index distribution by transmitting laser light to the base material of the optical fiber from the side surface thereof and measuring a refraction angle of the laser light.

Since the definition of the area C of the core region 2, the refractive index straight line L of the first clad region 3, the area T of the skirt part 31, and the boundary 11 in the refractive index distribution of the core base material can be defined in the same manner as that described in the refractive index distribution 10 of the single mode optical fiber 1 in FIG. 2, the descriptions thereof will be omitted.

[Step in Process of Performing Quality Determination]

In the process of performing the quality determination, the quality determination is performed with respect to the core base material by the T/C which is the ratio of the area T of the skirt part 31 outside the boundary 11 to the area C of the core region 2 in the refractive index distribution 10.

In the quality determination, the core base material whose T/C is 4% or more and 30% or less is determined as a good product.

The core base material whose T/C is 6% or more and 20% or less may be determined as a good product.

Next, in the step of performing the quality determination, an optical fiber base material is generated by forming the second clad region 4 on the outer peripheral side of the core base material determined to be as the good product.

Next, the single mode optical fiber 1 is manufactured by drawing the optical fiber base material generated as described above.

According to the manufacturing method of the single mode optical fiber 1 according to the embodiment, in the refractive index distribution 10 of the core base material, the quality determination is performed by the T/C which is the ratio of the area T of the skirt part 31 to the area C of the core region 2. In this quality determination, since the area C of the core region 2 and the area T of the skirt part 31 are defined as described above, the relationship between the skirting amount and the dispersion characteristics is hard to shift, thereby making it possible not only to manage manufacturing with an appropriate skirting amount, but also to accurately determine the quality of the core base material by the value of the T/C.

Next, in the quality determination, the core base material whose T/C is 4% or more and 30% or less is determined as the good product, and this core base material of this good product is used, thereby making it possible to manufacture the single mode optical fiber 1 having good dispersion characteristics, transmission loss, and hydrogen resistance characteristics. The core base material whose T/C is 6% or more and 20% or less is determined as the good product, and the core base material of this good product is used, thereby making it possible to manufacture the single mode optical fiber 1 having even better dispersion characteristics, transmission loss, and hydrogen resistance characteristics.

Depending on the VAD method or the OVD method, the value of the T/C changes under the manufacturing conditions when forming the porous base material including the core region 2 and the first clad region 3 provided on the outer peripheral side of the core region 2. As an example, for example, a gas flow rate supplied to a burner that forms a portion corresponding to the core region 2 of the porous base material is adjusted, and when the bulk density of the portion corresponding to the core region 2 of the porous base material is reduced, the value of the T/C becomes large, and when the bulk density thereof increases, the value of the T/C becomes small.

The value of the T/C changes even under the manufacturing conditions when this porous base material is sintered to generate a transparent core base material. For example, when the porous base material is dehydrated and then becomes transparent, the value of the T/C becomes large as the time taken for the dehydration increases, and the value of the T/C becomes small as the time taken therefor decreases.

Embodiment

The single mode optical fiber having a different value of the T/C defined in the embodiment is manufactured, a cutoff wavelength $\lambda c$, a mode field diameter MFD, and a zero dispersion wavelength are respectively measured, and evaluation of the transmission loss and the hydrogen resistance characteristics is performed. The results are shown in Table 1. Examples 2 to 6 are examples of the present disclosure, and examples 1 and 7 are comparative examples.

In any one of the examples, there is no horizontal portion in the first clad region 3 in the refractive index distribution 10, and the refractive index straight line L of the first clad region 3 when calculating the T/C is a value obtained by averaging all of the refractive indexes in the range of the central part 3M obtained by dividing the first clad region 3 into three parts in the refractive index distribution 10.

TABLE 1

| | T/C (%) | n1 (%) | n2 (%) | $\lambda c$ (nm) | MFD (µm) | zero dispersion wavelength (nm) | transmission loss and hydrogen resistance characteristics |
|---|---|---|---|---|---|---|---|
| Example 1 | 3.0 | 0.370 | 0.350 | 1265 | 9.15 | 1308 | B |
| Example 2 | 4.0 | 0.375 | 0.345 | 1265 | 9.15 | 1310 | A |
| Example 3 | 6.0 | 0.380 | 0.340 | 1270 | 9.20 | 1312 | S |
| Example 4 | 12.0 | 0.385 | 0.345 | 1270 | 9.20 | 1314 | S |
| Example 5 | 20.0 | 0.390 | 0.350 | 1275 | 9.20 | 1316 | S |
| Example 6 | 30.0 | 0.395 | 0.345 | 1280 | 9.25 | 1320 | S |
| Example 7 | 40.0 | 0.400 | 0.350 | 1280 | 9.25 | 1326 | S |

The evaluation results of the transmission loss and the hydrogen resistance characteristics in Table 1 indicate that A is good, S is even better, and B is not good.

As shown in the results of Table 1, as a result of evaluating the single mode optical fiber with the value of the T/C defined in the embodiment, the single mode optical fiber whose T/C is 40% (example 7 of comparative example) has a zero dispersion wavelength of 1326 nm. That is, the single mode optical fiber whose T/C is 40% is not desirable because the zero dispersion wavelength is shifted to the longer wavelength side than the transmission wavelength in a 1.3 µm band and thus the dispersion characteristics deteriorate. On the other hand, in the single mode optical fiber of the embodiment, since the zero dispersion wavelength is a value close to the transmission wavelength in a 1.3 µm band, the dispersion characteristics can be improved.

The results of the transmission loss and the hydrogen resistance characteristics indicate that example 1 is B, example 2 is A, and examples 3 to 7 are S.

From the above-described results, it can be seen that the T/C defined in the embodiment is set to 4% or more and 30% or less, thereby making it possible not only to prevent the increase in the transmission loss and the deterioration in the hydrogen resistance characteristics, but also to improve the dispersion characteristics.

It can be seen that the T/C is set to 6% or more and 20% or less, thereby making it possible not only to further surely prevent the increase in the transmission loss and the deterioration in the hydrogen resistance characteristics, but also to further improve the dispersion characteristics.

What is claimed is:

1. A single mode optical fiber having a refractive index distribution in which a refractive index continuously changes at a boundary between a core region and a first clad region, the singe mode optical fiber comprising:
the core region whose maximum refractive index is n1;
the first clad region provided on an outer peripheral side of the core region and having a refractive index smaller than the refractive index n1; and
a second clad region provided on an outer peripheral side of the first clad region and having a refractive index greater than a refractive index of an outer peripheral part of the first clad region, wherein
T/C, which is a ratio of an area T of a skirt part outside the boundary to an area C of the core region in the refractive index distribution, is 4% or more and 30% or less,
the boundary, in the refractive index distribution, is defined at a position where an absolute value of a change amount in a radial direction of the refractive index becomes maximum between the center of the core region and the outer peripheral part of the first clad region,
the area C of the core region, in the refractive index distribution, is defined by an area between a refractive index straight line of the first clad region and a straight line of an average refractive index of the core region in a range from the center of the core region to the boundary in the radial direction,
the area T of the skirt part, in the refractive index distribution, is defined by an area between the refractive index straight line of the first clad region and a curve of the refractive index distribution in a range where the refractive index is greater than the refractive index straight line of the first clad region in a range from the boundary to the outer peripheral part of the first clad region in the radial direction, and
the refractive index straight line of the first clad region, in the refractive index distribution, is defined by a value or a straight line approximation line obtained by averaging only a part or all of the refractive indexes in a range of a central part obtained by dividing the range from the boundary to the outer peripheral part of the first clad region into three parts in the radial direction.

2. The single mode optical fiber according to claim 1, wherein
the T/C is 6% or more and 20% or less.

3. The single mode optical fiber according to claim 2, wherein
a refractive index n2 at the center of the core region is smaller than refractive index n1.

4. The single mode optical fiber according to claim 1, wherein
a refractive index n2 at the center of the core region is smaller than refractive index n1.

5. A manufacturing method of a single mode optical fiber that has a refractive index distribution in which a refractive index continuously changes at a boundary between a core region and a first clad region, and that includes the core region whose maximum refractive index is n1; the first clad region provided on an outer peripheral side of the core region and having a refractive index smaller than the refractive index n1; and a second clad region provided on an outer peripheral side of the first clad region and having a refractive index greater than a refractive index of an outer peripheral part of the first clad region, comprising:
a process of generating a core base material including the core region and the first clad region;
a process of performing quality determination by measuring the refractive index distribution of the core base material;
a process of generating an optical fiber base material by forming the second clad region on the outer peripheral side of the core base material that is determined as a good product by the quality determination; and
a process of manufacturing the single mode optical fiber by drawing the optical fiber base material, wherein
the process of performing the quality determination includes a step of performing the determination by T/C which is a ratio of an area C of the core region and an area T of a skirt part outside the boundary in the refractive index distribution,
the boundary, in the refractive index distribution, is defined at a position where an absolute value of a change amount in a radial direction of the refractive index becomes maximum between the center of the core region and the outer peripheral part of the first clad region,
the area C of the core region, in the refractive index distribution, is defined by an area between a refractive index straight line of the first clad region and a straight line of an average refractive index of the core region in a range from the center of the core region to the boundary in the radial direction,
the area T of the skirt part, in the refractive index distribution, is defined by an area between the refractive index straight line of the first clad region and a curve of the refractive index distribution in a range where the refractive index is greater than the refractive index straight line of the first clad region in a range from the boundary to the outer peripheral part of the first clad region in the radial direction, and
the refractive index straight line of the first clad region, in the refractive index distribution, is defined by a value or a straight line approximation line obtained by averaging only a part or all of the refractive indexes in a range of a central part obtained by dividing the range from the boundary to the outer peripheral part of the first clad region into three parts in the radial direction.

* * * * *